May 7, 1968

R. ZITO, JR 3,382,102

ZINC-BROMINE SECONDARY CELL

Filed Sept. 2, 1965

Inventor:
Ralph Zito, Jr.
by Paul A. Frank
His Attorney.

United States Patent Office 3,382,102
Patented May 7, 1968

3,382,102
ZINC-BROMINE SECONDARY CELL
Ralph Zito, Jr., Schenectady, N.Y., assignor to General Electric Company, a corporation of New York
Filed Sept. 2, 1965, Ser. No. 484,556
5 Claims. (Cl. 136—30)

ABSTRACT OF THE DISCLOSURE

A secondary cell has a zinc electrode, a bromine electrode with a carbon matrix having pockets containing activated carbon, a zinc bromine electrolyte, and a gelling agent incorported in the electrolyte. A series-type battery has a plurality of these cells.

My invention pertains to improved cells and batteries employing zinc bromide as an electrolyte.

As illustrated by Sidney Barnartt and David A. Forejt, "Bromine-Zinc Secondary Cells," Journal of the Electrochemical Society, November 1964, and the articles cited therein, the advantages to be gained in building cells and batteries utilizing the high difference in electrode potential between zinc and bromide have been long appreciated. As also illustrated by Barnartt and Forejt, probably the most outstanding reason such cells have not achieved practical application relates to the formation of zinc dendrites which short-circuit the electrodes of such cells.

It is an object of my invention to provide zinc-bromine cells and batteries which are more resistant to zinc dendrite shorting.

It is another object of my invention to provide an improved zinc electrode for use in zinc-bromine cells.

These and other objects of my invention are accomplished by providing a cell including a zinc electrode, a porous bromine electrode, and an aqueous zinc bromide containing electrolyte lying between the electrodes. At least the portion of the electrolyte lying adjacent the bromine electrode contains a gelling agent, and when the gelling agent contacts the zinc electrode, such electrode preferably includes vents.

Figure 1:
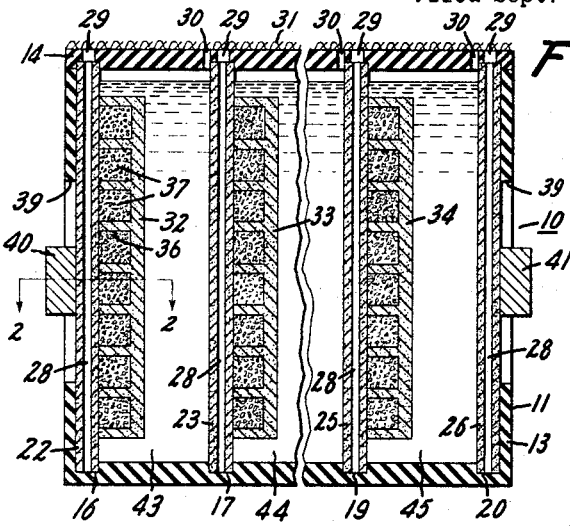
Figure 2:
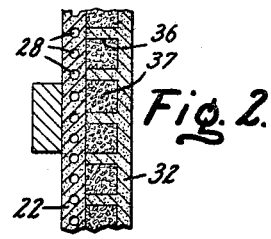
Figure 3:
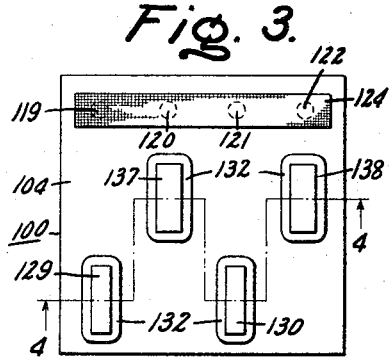
Figure 5:
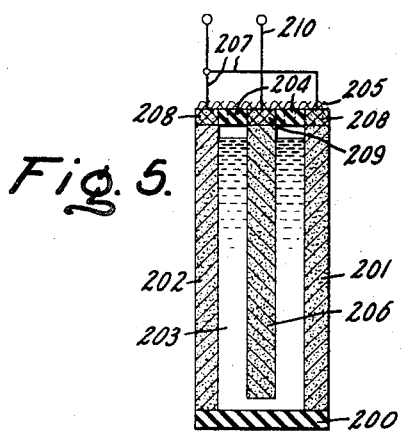
Figure 4:
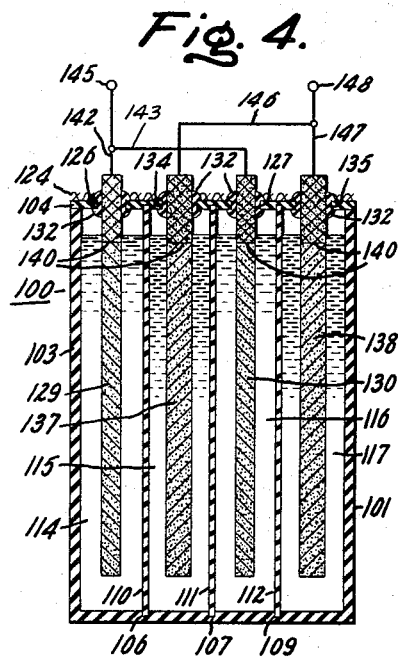
Figure 6:
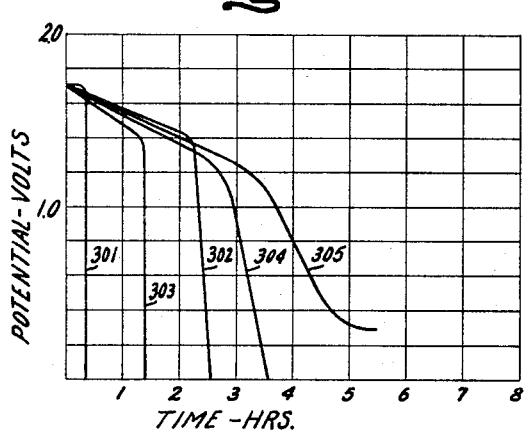

My invention may be more fully understood by reference to the following detailed description and the drawings in which:

FIGURE 1 is a series-type battery shown in vertical section,
FIGURE 2 is a detail taken along line 2—2 in FIGURE 1,
FIGURE 3 is a plan view of a cell,
FIGURE 4 is a vertical section taken along line 4—4 in FIGURE 3,
FIGURE 5 is a vertical section of an alternate cell, and
FIGURE 6 is a plot of voltage versus time.

The terms "zinc electrode" and "bromine electrode" are not intended to imply that the electrode elements are formed of these materials exclusively. These terms are used merely to indicate the electrochemically active element reacting, as is conventional practice.

In a binc-bromine secondary cell, the electro-chemical reactions may be expressed as follows:

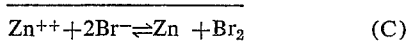

where
(A) is the chemical reaction occurring at the negative or zinc electrode,
(B) is the chemical reaction occurring at the positive or bromine electrode, and
(C) is the over-all cell reaction. The arrows to the right indicate the direction of the chemical reactions during charge of the cell and the arrows to the left indicate the chemical reactions occurring during cell discharge.

The skeleton or matrix elements of the zinc and bromine electrodes are preferably porous, electrically conductive, and non-corrosive. Carbon in various forms is preferred for the electrode matrices. In the case of bromine electrodes, it is necessary that substantial amounts of bromine be adsorbed in the carbon. It is, accordingly, preferred that the bromine electrode be formed of porous carbon and, most preferably, with internally contained pockets of active carbon such as highly adsorptive charcoal. If desired, the entire matrix may be formed of activated carbon. The carbon of the zinc electrode serves as a plating surface for zinc. It may be desirable to utilize either porous carbon or graphite to form zinc electrodes. In all cases, the carbon forming the electrode skeleton or matrix should possess sufficient structural integrity to allow handling and mounting as a unitary element. To this end the electrodes may include reinforcing elements such as cloth, fibers, etc., which are substantially chemically inert. Fiber glass and asbestos constitute preferred reinforcing materials although certain plastics, particularly fluorocarbon polymers could also be used.

To form the electrolyte of the battery, an aqueous solution containing zinc bromide in an amount of from 0.5 mole to saturation is employed. For most efficient performance, it is generally preferred that the molarity range from 3 to 6. It is a distinct feature of my invention that at least the portion of the electrolyte lying in contact with the bromine electrode include a gelling agent. Any gelling agent which is substantially unreactive in the cell environment may be employed. The gelling agent should be added in an amount sufficient to impart a consistency or apparent viscosity of at least 10,000 centipoises. It is generally preferred that sufficient gelling agent be added to form a paste. Any one of a variety of well-known, conventional gelling agents may be employed. Exemplary gelling agents include various starches, finely divided asbestos, finely divided silica, etc. The amount of gelling agent required to obtain the desired consistency will, of course, vary depending on the specific material chosen. Using a preferred gelling agent, anhydrous, particulate colloidal silica, such as marketed under the trademark "Cab-O-Sil," optimum gelling is achieved using from 6 to 15 grams of silica per 100 ml. of electrolyte. By contrast, with corn starch from 20 to 40 grams per 100 ml. of electrolyte are required to achieve an optimum consistency.

FIGURES 1 and 2 illustrate a series-type battery 10 provided with a housing 11 formed of a lower case portion 13 and an upper closure portion 14. The housing is provided with four parallel interior grooves 16, 17, 19, and 20 lying in both the case and closure portions. Carbon matrices 22, 23, 25, 26 are sealingly fitted into the grooves 16, 17, 19, and 20 respectively. Each matrix is formed of a porous, non-corrosive electrical conductor. A plurality of passages 28 are provided in each matrix. A plurality of ports 29 in the upper closure are aligned with the passages 28, while a plurality of vents 30 lie in the closure adjacent but spaced from the matrices 23, 25, and 26. A micro-porous cover 31 attached to the upper closure overlies the ports and vents.

Pocketed matrices 32, 33, and 34 are mounted on the vented matrices 22, 23, and 25, respectively, in electrically conductive relation therewith. Each of the pocketed matrices is forced of an electrically conductive, porous, noncorrosive material, such as carbon. In each pocket 36 is contained activated charcoal 37.

Each end of the housing is provided with an opening 39 adjacent vented matrices 22 and 26, and positive and negative electrical terminals 40 and 41, respectively, are provided on these matrices. A body of electrolyte 43 lies between matrices 28 and 32 while similar electrolyte bodies 44 and 45 lie between matrices 33 and 25 and 34 and 26, respectively.

The series-type battery 10 may be easily assembled by conventional fabricating techniques. The battery may be placed in operation by adding an aqueous electrolyte containing zinc bromide and a gelling agent to form electrolyte bodies 43, 44, and 45. Next, direct current is supplied to the battery at terminals 40 and 41 so as to deposit bromine from the electrolyte within and on pocketed matrices 32, 33, and 34 and to plate zinc from the electrolyte onto the vented matrices 23, 25, and 26.

At any time subsequent to charging, the battery will supply direct current when an electrical load is placed across the terminals. The plated matrices 23, 25, and 26 function as zinc electrodes returning zinc ions to the electrolyte upon placing a load across the cell terminals. Similarly, the pocketed matrices 32, 33, and 34 function as bromine electrodes and return bromide ions upon discharge. The matrix 22, of course, does not function as an electrode but merely as a structural wall for the cell, and is shown provided with the general structural features of an electrode merely to avoid forming a separate structural element to perform its function.

In actual operation, there is a tendency for hydrogen gas to be generated. It is believed that hydrogen is generated according to the following chemical reactions:

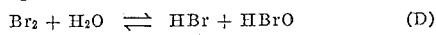

$$Br_2 + H_2O \rightleftharpoons HBr + HBrO \qquad (D)$$

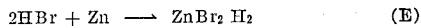

$$2HBr + Zn \longrightarrow ZnBr_2 \, H_2 \qquad (E)$$

If gelled electrolyte were incorporated in a conventional zinc-bromine cell configuration, the cells could become polarized due to trapping hydrogen gas bubbles on the surface of the zinc electrode, the gel possibly preventing the gas from rising to the electrolyte surface. In the series-type battery configuration shown in FIGURES 1 and 2, however, hydrogen gas buildup on the surface of the zinc electrodes is prevented by passages 28, which effectively vent the hydrogen. Ports 30 are provided as an optional structural feature in the event a small fraction of the hydrogen formed should rise along the surface of the zinc electrode rather than be vented through passages 28.

As is well understood in the art, repeated charging and discharging of zinc-bromine cells causes the formation of zinc dendrites which grow from the zinc electrode until they short the cell by extending into contact with the bromine electrode. Cells formed according to my invention, however, are longer lived than conventional zinc-bromine cells. It is believed that this longer life span is attributable to retarding the growth of zinc dendrites. In particular, it is theorized that substantial quantities of free bromine lie in the gel relatively immobilized adjacent the surface of the bromine electrode. As dendrites grow toward the bromine electrode, they tend to be dissolved by reaction with the free bromine held in the gelled electrolyte. This substantially retards the rate of dendrite growth and prolongs the life of the cells.

Referring specifically to the series-type battery shown in FIGURES 1 and 2, the formation of zinc dendrites from zinc electrodes 23, 25, and 26 is held to a low level by the fact that zinc is merely plated onto the carbon matrices rather than forming the entire structural elements. Further, dendrite growth through the electrolyte bodies 43, 44, and 45 toward the bromine electrodes 32, 33, and 34, respectively, is further retarded by the dissolving action of free bromine held immobilized in the gelled electrolyte bodies.

My invention is further illustrated by reference to FIGURES 3 and 4, in which a zinc-bromine cell 100 is provided with a housing 101 formed of a lower case portion 103 and an upper closure portion 104. The housing is provided with three parallel interior grooves 106, 107, and 109 lying in both the case and closure portions. Micro-porous barriers 110, 111, and 112 are mounted in the grooves. The barriers are formed of materials which are permeable to aqueous solutions and impermeable to gels, such as porous polyvinyl chloride, porous poly ethylene, glass cloth, etc. The micro-porous barriers divide the housing into compartments 114, 115, 116, and 117. Compartments 114 and 116 contain an aqueous solution of zinc bromide and no gelling agent. Compartments 115 and 117 contain gelled zinc bromide solutions.

The upper closure portion contains vents 119, 120, 121, and 122 for the compartments 114, 115, 116, and 117, respectively. The vents are provided with a micro-porous cover such as a hydrophobic cloth to allow venting while preventing electrolyte leakage. Above compartments 114 and 116, the closure portion is provided with openings 126 and 127. Electrode matrices 129 and 130 extend through the respective openings and are sealed to and supported by the closure through gaskets 132. Similarly, above compartments 115 and 117 the closure portion is provided with openings 134 and 135 through which electrode matrices 137 and 138 extend. Matrices 137 and 138 are similarly sealed by gaskets 132.

In order to prevent leakage of gaseous bromine from the cell through the electrode matrices, the upper portion of each matrix is filled with an inert material, such as wax, fluorocarbon polymer, etc., so that the pores of the matrices are completely closed. Preferably, the impregnant extends in the matrices to a level 140 approximately corresponding to the upper surface of the electrolyte. As schematically shown in FIGURE 4, electrical leads 142 and 143 connect electrode matrices 129 and 130 in parallel to cell terminal 145, while leads 146 and 147 connect matrices 137 and 138 to terminal 148.

In operation of the cell 100, the matrices 129 and 130 function as zinc electrodes while the matrices 137 and 138 function as bromine electrodes. It is unnecessary to provide vents in the zinc electrodes, since the electrolyte adjacent the zinc electrodes contains no gelling agent and any miscellaneous gases formed in the electrolyte are free to migrate to the surface thereof for venting.

The following examples are intended to illustrate rather than to limit my invention:

Example 1

A plurality of cells of the type shown in FIGURE 5 were constructed. Each cell was formed of a casing 200 sealingly joined to carbon electrodes 201 and 202 to form an electrolyte chamber 203. The upper portion of the casing was provided with vent ports 204 covered by a micro-porous barrier 205. A carbon electrode 206 was mounted mid-way between the electrodes 201 and 202. The latter electrodes were connected in parallel by electrical leads 207 brazed to a metalized surface on the carbon. Electrode 206 is similarly attached to lead 210. The upper ends of the electrode were impregnated with wax at 208 and 209.

The opposing faces of electrodes 201 and 202 were separated by a spacing of 3/8 inch. The thickness of carbon electrode 206 was 1/8 inch. Each electrode was provided with approximately 5 in.² of active surface area per side.

Example 2

A plurality of cells formed according to Example 1 were provided with porous carbon electrodes 206 and filled with approximately 26 cc. of 3.5 molar zinc bromide. The cells were tested providing a current 1 ampere. The relationship of voltage and time at 1 ampere is plotted by curve 301 in FIGURE 6. Other cell characteristics are set out in Table I.

Example 3

A plurality of cells were formed according to Example 2, except that the electrolyte was gelled using 30–40 grams of corn starch per 100 ml. of electrolyte. The relationship of voltage and time at 1 ampere is plotted by curve 302 in FIGURE 6. Other cell characteristics are set out in Table I.

Example 4

A plurality of cells were formed according to Example 2, except that the electrolyte was gelled using 12–15 grams of finely divided silica (commercially available under the trademark "Cab-O-Sil") per 100 ml. of electrolyte. The relationship of voltage and time at 1 ampere is plotted by curve 303 in FIGURE 6. Other cell characteristics are set out in Table I.

Example 5

A plurality of cells formed according to Example 1 were provided with activated carbon electrodes 206 and filled with approximately 26 cc. of 3.5 molar zinc bromide. The relationship of voltage and time at 1 ampere is plotted by curve 304 in FIGURE 6. Other cell characteristics are set out in Table I.

Example 6

A plurality of cells were formed according to Example 5, except that the electrolyte was gelled using 12–15 grams of finely divided silica per 100 ml. of electrolyte. The relationship of voltage and time at 1 ampere is plotted by curve 305 in FIGURE 6. Other cell characteristics are set out in Table I.

TABLE I

|  | Ex. 2 | Ex. 3 | Ex. 4 | Ex. 5 | Ex. 6 |
|---|---|---|---|---|---|
| Capacity, watts/hr | 1–3 | 12–20 | 10–15 | 25–40 | 40–55 |
| Shorting, cycles | 5–10 | >100 | >100 | 3–5 | >100 |
| Retentivity, hrs | 0.1–0.3 | 10–30 | 1–10 | 30–100 | 50–500 |

The capacity of each of the types of cells was determined by testing the cells under various conditions and recording the average maximum output in watts/hour obtainable. Each type of cell was tested for short-circuiting by placing on 1 ampere constant drain and running through a full charge and discharge cycle in a 24-hour period. Cells containing a gelled electrolyte did not fail through short-circuit and hence the number of cycles in excess of 100 that might be necessary to produce short-circuiting cannot be determined. The test of retentivity was performed by bringing each type of cell to full charge and measuring the length of time required for the voltage of the cell to decay to ½ its original value while delivering no current. No test results are shown for cell structures having an active carbon electrode and a starch gelled electrolyte. The starch prevented the electrolyte from being adsorbed by the active carbon and hence no meaningful results could be obtained. Another factor of significance not apparent from Table I is that the starch used as a gel was slowly decomposed to sugars, probably by the action hydrogen bromide, note reaction (D). The gelled silica did not, however, show any tendency toward decomposition.

It is appreciated that numerous variations on the preferred cell and battery configurations illustrated will be readily suggested to those skilled in the art. It is accordingly intended that the scope of my invention be determined by reference to the following claims.

What I claim as new and desire to secure by Letters Patent of the United States is:

1. A cell comprising a zinc electrode, a bromine electrode, said bromine electrode formed of a carbon matrix having pockets, said pockets each containing activated carbon, a zinc bromide electrolyte, and a gelling agent incorporated in the electrolyte.

2. The combination according to claim 1, additionally including means maintaining the gelling agent adjacent the bromine electrode and spaced from the zinc electrode.

3. The combination according to claim 1, in which the zinc electrode is provided with venting passages.

4. A series-type battery comprising, a plurality of cells; each of the cells comprising a zinc electrode, a bromine electrode, a zinc bromide electrolyte, and a gelling agent incorporated in the electrolyte; the zinc and bromine electrodes of adjacent cells lying in contiguous, electrically conductive relation, each of the bromine electrodes formed of a carbon matrix having pockets, and each of the pockets containing activated carbon.

5. A series-type battery according to claim 4, in which the zinc electrodes each include venting passages.

References Cited

UNITED STATES PATENTS

| 1,119,024 | 12/1914 | Little | 136—86 |
| 1,163,834 | 12/1915 | Little | 136—86 |
| 2,612,532 | 9/1952 | Heise et al. | 136—86 |
| 1,399,995 | 12/1921 | Pouchain | 136—30 |
| 2,924,634 | 2/1960 | Fischbach et al. | 136—86 |
| 3,218,195 | 11/1965 | Corren | 136—86 |

ALLEN B. CURTIS, *Primary Examiner.*